(12) United States Patent
Allen

(10) Patent No.: US 7,053,777 B2
(45) Date of Patent: *May 30, 2006

(54) INTERROGATION, MONITORING AND DATA EXCHANGE USING RFID TAGS

(75) Inventor: Barry Allen, Kelowna (CA)

(73) Assignee: Identec Solutions Inc., Kelowna (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/133,298

(22) Filed: May 20, 2005

(65) Prior Publication Data

US 2005/0219039 A1    Oct. 6, 2005

Related U.S. Application Data

(60) Division of application No. 10/373,175, filed on Feb. 26, 2003, now Pat. No. 6,917,291, which is a continuation-in-part of application No. 09/426,883, filed on Oct. 26, 1999, now Pat. No. 6,563,417.

(60) Provisional application No. 60/105,564, filed on Oct. 26, 1998, provisional application No. 60/105,566, filed on Oct. 26, 1998, provisional application No. 10/105,565, filed on Oct. 26, 1998.

(51) Int. Cl.
*G08B 13/14* (2006.01)

(52) U.S. Cl. .................. 340/572.1; 340/10.1; 340/505; 340/539.1; 340/539.11; 340/539.13

(58) Field of Classification Search ............... 340/10.1, 340/505, 539.1, 539.11, 539.13, 572.1, 825.69, 340/825.72
See application file for complete search history.

(56) References Cited

U.S. PATENT DOCUMENTS

| | | | |
|---|---|---|---|
| 4,636,950 A * | 1/1987 | Caswell et al. ................ 705/28 |
| 4,895,454 A * | 1/1990 | Kammleiter et al. ........ 374/163 |
| 5,266,925 A * | 11/1993 | Vercellotti et al. .......... 340/505 |
| 5,289,372 A * | 2/1994 | Guthrie et al. ................ 705/28 |
| 5,373,282 A * | 12/1994 | Carter ........................ 340/5.3 |
| 5,434,790 A * | 7/1995 | Saka et al. .................. 700/110 |
| 5,563,579 A * | 10/1996 | Carter ................... 340/539.17 |
| 5,662,048 A * | 9/1997 | Kralj et al. ................ 108/56.3 |
| 5,671,362 A * | 9/1997 | Cowe et al. .................. 705/28 |
| 5,682,142 A * | 10/1997 | Loosmore et al. ........ 340/572.1 |
| 5,712,789 A * | 1/1998 | Radican ...................... 700/226 |
| 6,006,148 A * | 12/1999 | Strong ......................... 701/33 |
| 6,563,417 B1 * | 5/2003 | Shaw ........................ 340/10.1 |

* cited by examiner

*Primary Examiner*—Daryl C Pope
(74) *Attorney, Agent, or Firm*—Anthony C. Edwards

(57) ABSTRACT

A method and apparatus for identification and monitoring of, and obtaining data relating to, products moving along a distribution path, including at least one RFID tag mountable to a product, or product carrier, and a plurality of interrogators spaced apart along the distribution path, wherein each interrogator of the plurality of interrogators cooperates in RF communication with the RFID tag when the RFID tag is in proximity to the each interrogator along the distribution path. Each interrogator interrogates the RFID tag during the RF communication so as to obtain unique data, unique to the RFID tag. The RFID tag and each interrogator each includes a transceiver and memory, the memory.

24 Claims, 8 Drawing Sheets

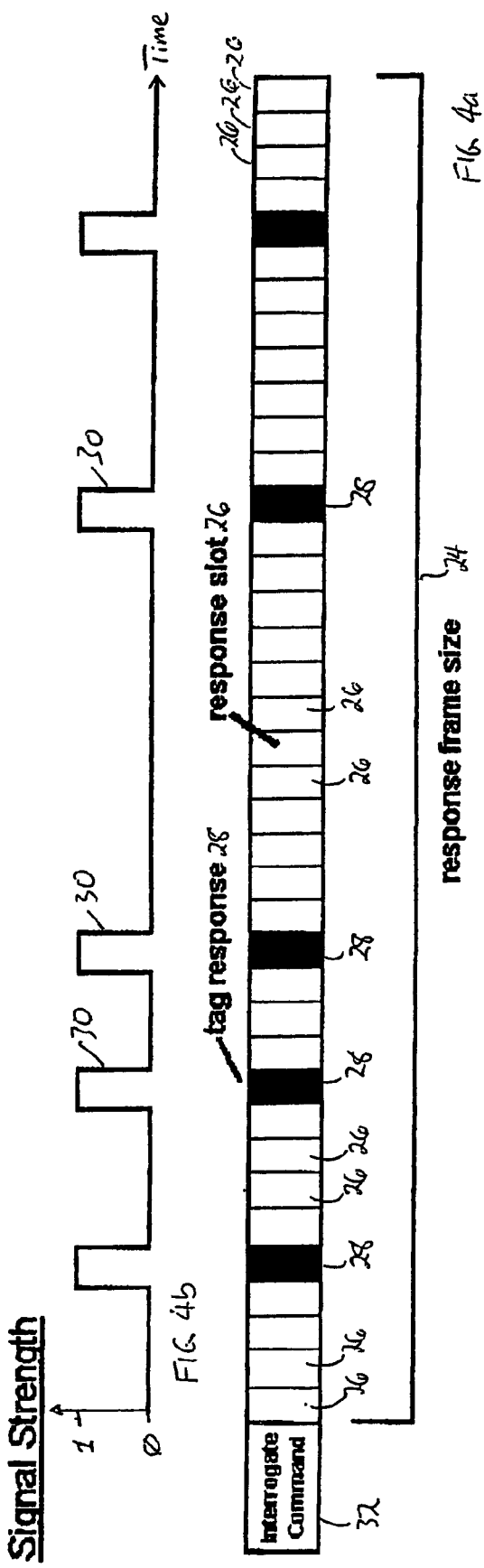
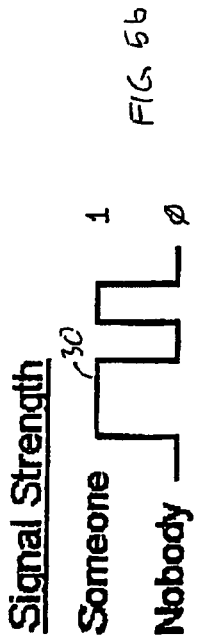
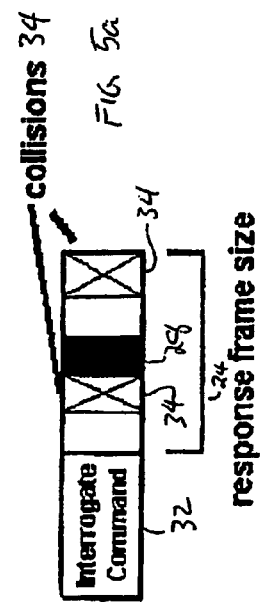

Roll Call

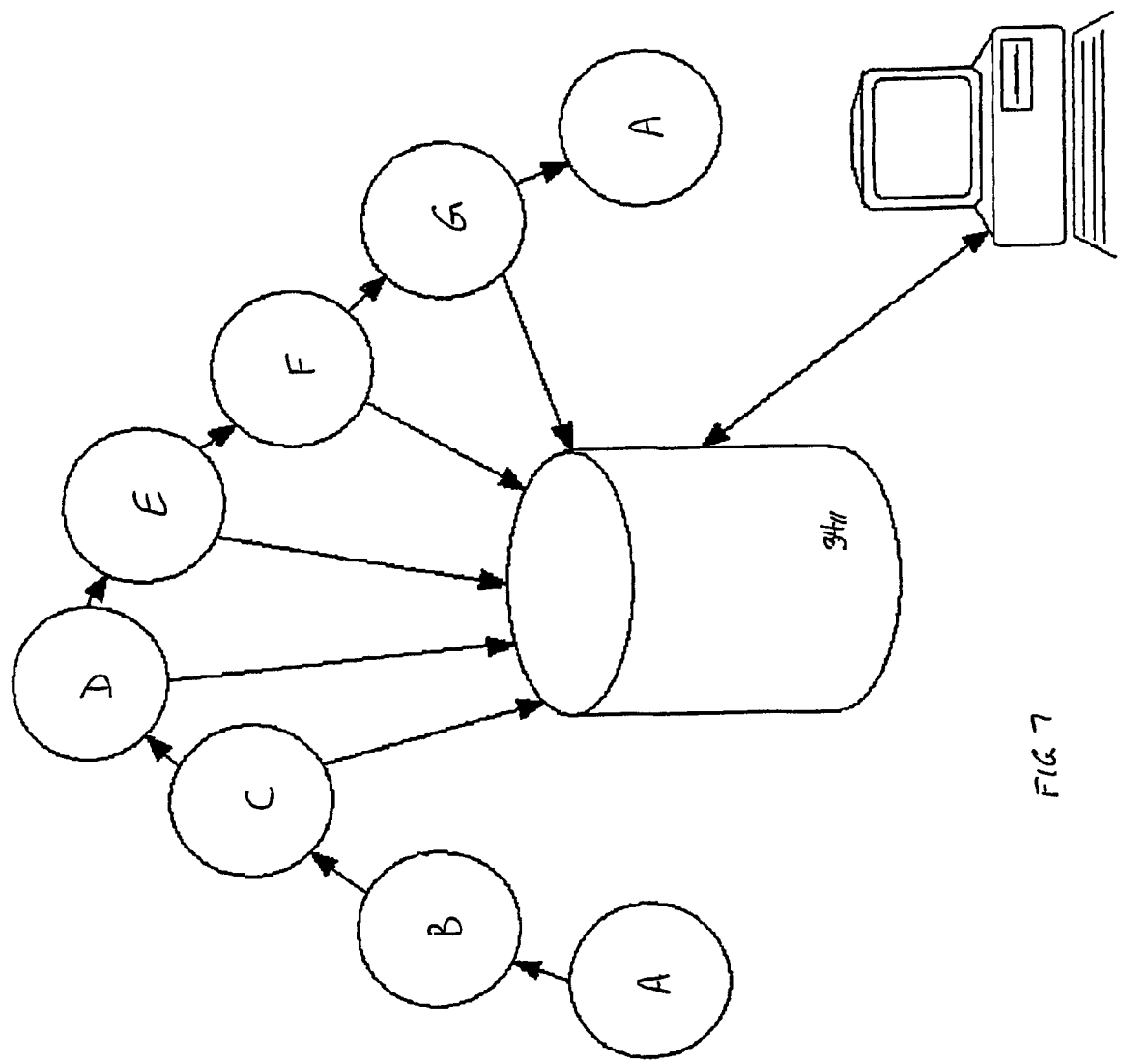

INTERROGATION, MONITORING AND DATA EXCHANGE USING RFID TAGS

CROSS REFERENCE TO RELATED APPLICATIONS

This application is a Divisional Patent Application of U.S. patent application Ser. No. 10/373,175 filed Feb. 26, 2003 now U.S. Pat. No. 6,917,291 which is a Continuation-in-Part of U.S. patent application Ser. No. 09/426,883 filed Oct. 26, 1999 now U.S. Pat. No. 6,563,417 which claims priority from U.S. Provisional Patent Application No. 60/105,564 filed Oct. 26, 1998, titled Method and Apparatus for RFID Temperature Monitoring and Logging Tags; U.S. Provisional Patent Application No. 60/105,567 filed Oct. 26, 1998, titled Method and Apparatus for RFID Data Broadcasting; U.S. Provisional Patent Application No. 60/105,566 filed Oct. 26, 1998 titled Method and Apparatus for Internet Database and Networking for Shared RFID Data; and U.S. Provisional Patent Application No. 60/105,565, filed Oct. 26, 1998, titled Method and Apparatus for Traffic Density Controlled Time Domain Multiplexing Frame Size.

FIELD OF THE INVENTION

This invention relates to the field of radio frequency identification tags and the use of such RFID tags within a tag interrogating and feedback system for real time tracking and data transfer with such tags for product monitoring along a product distribution flow path within a product distribution web.

BACKGROUND OF THE INVENTION

There exists many attempts in the prior art to remotely uniquely identify product items and to collect, collate and process such product identifiers so as to provide a centralized reporting and tracking capability over such product items when widely distributed.

For example, applicant is aware of U.S. Pat. No. 5,289,372 which issued to Guthrie et al on Feb. 22, 1994 for a Global Equipment Tracking System. Guthrie teaches an attempt to keep track of the changing configurations of individual computers tied to a central data base by means of modem communication. The product items being tracked are in fact the various hardware units which configure each computer. Each hardware unit has associated therewith a sensor. Each sensor is hardwired to a collector for each computer. The collector for each computer transmits its configuration information, based on input from the sensors, when interrogated via modem communication by a host computer. The problems associated with tracking individual product items which are being quickly distributed along distribution paths within a distribution web are not addressed.

Applicant is also aware of U.S. Pat. No. 4,636,950 which issued Jan. 13, 1987 to Caswell et al for an Inventory Management System Using Transponders Associated With Specific Products. Caswell discloses the use of radio frequency transponders on relatively expensive to purchase items which may spend relatively long periods of time at a dealer's location where, for example, motorcycles or automobiles may be sold. Caswell teaches the use of short range radio transponders built into each product so as to uniquely identify each product, upon interrogation by a fixed interrogation transponder at the dealer's location, with a unique identification code preinstalled into random access memory in the product transponder. A host or central computer system, via modem communication to computers at the dealer's locations, relay commands that trigger the dealer's interrogator transceivers to interrogate the transponder equipped products in the dealer's inventory using, sequentially, each of the serial numbers of the products which have been shipped to that dealer and which are not known to the host computer system to have left the dealer's inventory. It is taught that in, for example, sufficiently large showroom areas, to use a multiplicity of interrogatory transceivers. It is also taught that interrogations by the interrogator transceivers are repeated at least in cases where unusual responses are encountered, to observe consistency and permit overcoming a limited amount of noise interference. It is further taught that an interrogator transceiver might be placed with its antenna field covering an exit or entrance into a merchandise storage area so as to check that properly scheduled product units are exiting or entering. The inherent limitations in such "choke-point" interrogations are in part recognized in that Caswell states that in cases such as factory or warehouse exits where it is desired to monitor a large number of units in limited interrogation time, the use of ambiguous codes transmitted by the interrogating transceiver or the use of different operating frequencies may allow for unique identification of different product items or groups of such items such as brands or types of merchandise. The solution to the problem of the choke-point interrogation such as taught in the present invention is not suggested.

Applicant is also aware of U.S. Pat. No. 5,671,362 which issued to Cowe et al on Sep. 23, 1997 for Materials Monitoring Systems, Materials Management Systems And Related Methods. Cowe teaches the inventory tracking of items that will fit on a sensor equipped shelf. The shelf sensors may detect items by the presence of the item's weight upon the shelf. It is also taught that each product packaging will include a label which is machine readable, the label being, for example, bar code, magnetic, holographic or radio-emitting so as to provide for identification and tracking of the product. It is also taught that the sensing systems may include three dimensional movement detection systems employing infrared, ultrasound, optical, radio wave or otherwise signaling techniques accompanied by suitable processing such as ranging or imaging to determine the inventory status of stored items on the shelf. The problems actually associated with unique identification and tracking using radio frequency transponders, which it is one of the objects of the present invention to address, are not taught nor suggested, and nor are the solutions.

Applicant is also aware of U.S. Pat. No. 5,266,925 which issued Nov. 30, 1993 to Vercellotti et al for an Electronic Identification Tag Interrogation Method. Vercellotti discloses a method of retrieving unique tag identification signals when multiple signals are received upon electronic interrogation at a portal. Upon receipt of more than one reply by the interrogator at the portal, the interrogation address is bisected and retransmitted, and subsequently again bisected and retransmitted until a single response is isolated. The method is then repeated to isolate and identify the remaining tags. The handling of choke-point interrogation and multiple replies such as employed in the present invention is neither taught nor suggested.

With respect to the use of environmental sensors, such as temperature sensors cooperating with RFID tags, in the prior art it is known to use temperature loggers not associated with real time communication of the data to remote interrogators. Prior art temperature loggers are electronic or mechanical devices that record temperature over a time period. Temperature loggers used in prior art mobile applications do not have communications links to aid in automation and therefore require significant human intervention. That is, in the prior art, it has been impossible to fully automate the temperature logging process. The data contained in a temperature logger needs human intervention to extract its log. Sometimes, depending on the design of the logger, the logger needs to be sent away to be processed, the results being returned in electronic or paper format. Because of the human intervention, monitoring, as a real-time event, and automatic log retrieval and analysis are not possible.

SUMMARY OF THE INVENTION

In summary, the method and apparatus of the present invention for identification and monitoring of, and obtaining data relating to, products moving along a distribution path includes at least one RFID tag mountable to a product or product carrier, such as a pallet or container, and a plurality of interrogators spaced apart along the distribution path. Each interrogator of the plurality of interrogators cooperates in radio frequency (RF) communication with the RFID tag when the RFID tag is in proximity to each interrogator along the distribution path. Each interrogator interrogates the RFID tag during the RF communication so as to obtain unique data, unique to the RFID tag.

In one embodiment, each interrogator communicates the unique data to a central data base. The central database has associated with it a central database processor. The processor cooperates with the central database and communicates with the plurality of interrogators so as to obtain up-to-date data, including the unique data, from the RFD tag as the RFID tag progresses along the distribution path.

Distributed processors along the distribution path are also in communication with the central database processor so that the distributed processors may obtain feedback information and data from the central database no matter where the RFID tag is along the distribution path. This enables the distributed processors to obtain up-to-date product status data.

Each RFID tag and each interrogator comprises a transceiver and memory. The memory cooperates with the transceiver. In one aspect of the present invention the RFID tag may further comprise a data gathering sensor. The data gathering sensor may be an environmental status sensor such as a temperature sensor. In the preferred embodiment, the plurality of interrogators include at least one choke point interrogator, and may also include handheld or broadcast interrogators. The choke point interrogator interrogates for tag identifiers (ID's) by means of time division multiplexing. The frame sizes within the time division multiplexing are adjusted by an interrogator processor calculating a collision rates. The frame sizes are optimized by an optimizing frame size adjustment based on the collision rate. The collision rate is calculated as between responses from the RFID tag in response to the interrogation from the choke point interrogator and responses from other RFID tags within a choke point communication range of the choke point interrogator.

The collision rate is determined by the choke point interrogator by the interrogator processor comparing:
  (a) a cumulative first time period within the frame sizes wherein a signal strength detected by the choke point interrogator is increased so as to indicate transmission of responses from all the RFID tags, with
  (b) a cumulative second time period within the frame sizes corresponding to known valid responses received by the choke point interrogator from all the RFID tags.

The interrogator processor calculates the optimizing frame size adjustment by increasing a total cumulative time within the frame sizes if the collision rate is higher than an optimal collision rate, and by decreasing the total cumulative time within the frame sizes if the collision rate is lower than the optimal collision rate. The optimal collision rate is, in one embodiment, between 10 to 40 percent and may be between 20 to 30 percent.

The choke point interrogator interrogates all the RFID tags within the choke point interrogator communication range in a rollcall until a statistical confidence level is obtained as determined by the choke point interrogator processor calculating a confidence level and the confidence level indicating that all the RFID tags have all successfully been identified.

Preferably the distributed processors spaced along the distribution path and the plurality of interrogators are located at corresponding producer, shipment, warehousing, and retailing locations. The communication of the distributed processors with the central database processor may advantageously be via the internet so as to allow feedback along the distribution path to locations upstream and downstream of a product's location.

BRIEF DESCRIPTION OF THE DRAWINGS

FIG. 4a is a diagrammatic illustration of a too large response frame size.

FIG. 4b is a time based plot of signal strength corresponding to the response frame size of FIG. 4a.

FIG. 5a is diagrammatic illustration of a too small response frame size.

FIG. 5b is a time-based plot of signal strength corresponding to the response frame size of FIG. 5a.

FIG. 7 is a diagrammatic illustration of the internet networking of stations along the distribution path of FIG. 3 to a central database.

DETAILED DESCRIPTION OF PREFERRED EMBODIMENTS

RFID tags are electronic devices that communicate via radio frequency transmissions. They can be intelligent or just respond with a simple ID to radio frequency interrogations. A RFID tag can contain memory. This memory can be loaded with data either via an interrogator, or directly by some integrated data gathering element of the tag, for example, an environmental sensor. This data is retrieved some time later when it is required. RFID tags by virtue of their communications links are a tool to aid automation. One example of their use is in temperature monitoring and logging of, for example, palletized goods.

Figure 1:
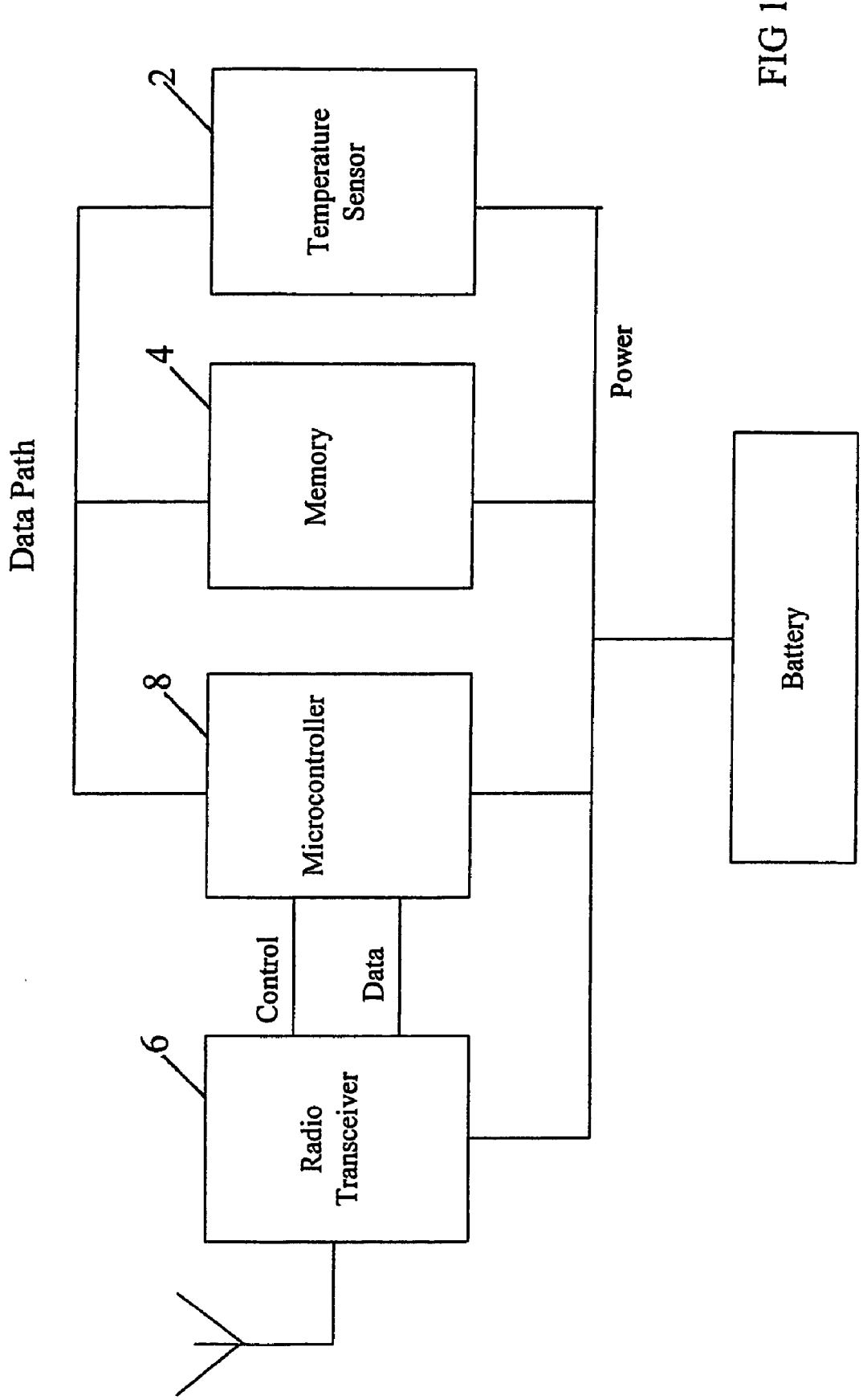
FIG. 1 is a diagrammatic illustration of an RFID Tag incorporating a temperature sensor.
Figure 2:
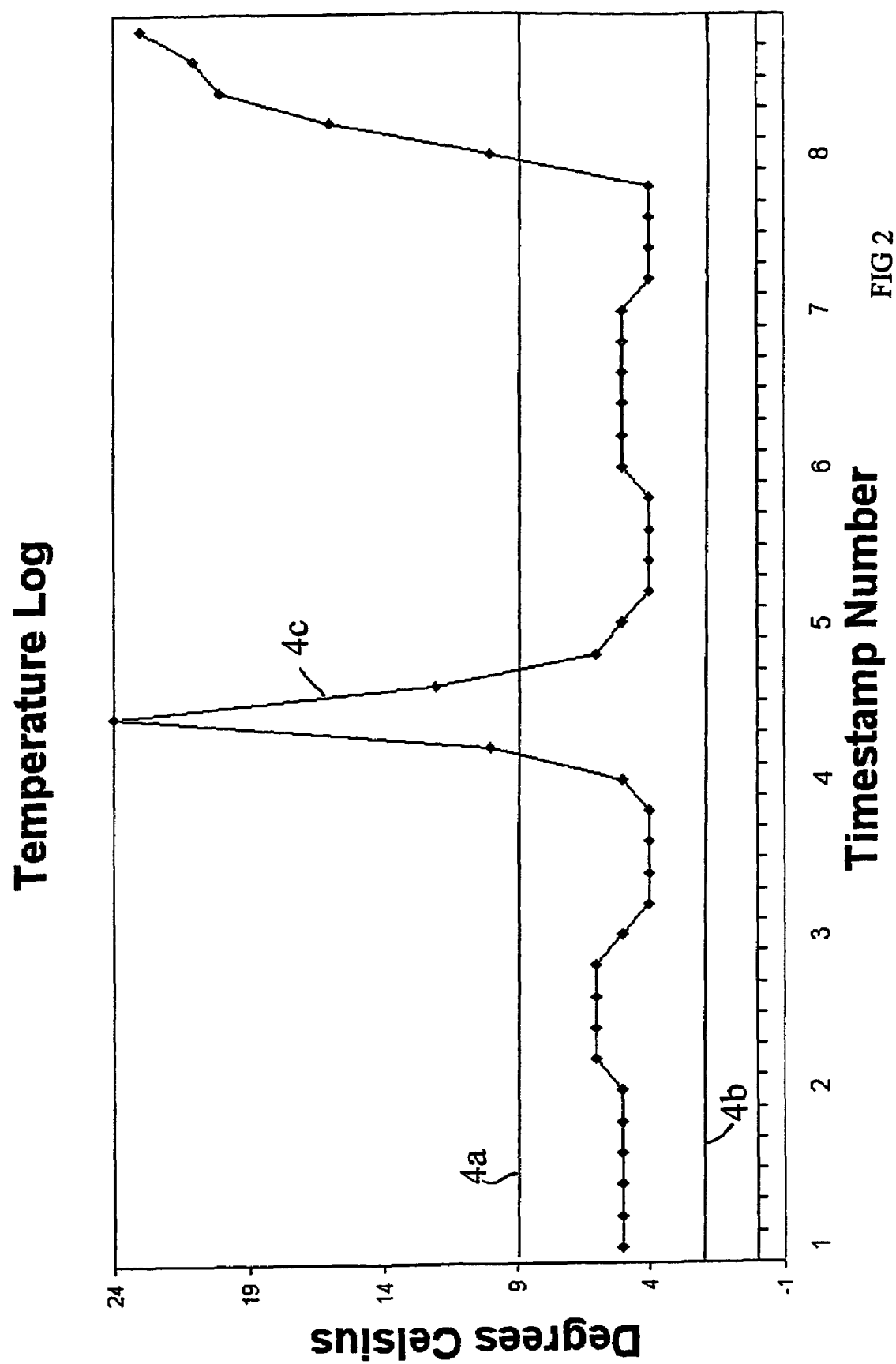
FIG. 2 is a temperature log graph.

It is one object of the present invention to provide an RFID tag cooperating with an electronic temperature logger such as illustrated in FIG. 1. Temperature sensor 2 senses and transmits temperature data to memory module 4. When triggered by RF interrogation via radio transceiver 6, microcontroller 8 fetches the data from memory module 4 and sends it out to the interrogator as multiplexed data packets from radio transceiver 6. In this manner, not only can a historical temperature log stored in memory in the RFID tag be retrieved without human intervention, but also out of limits temperature excursion alarms can be 'announced' by autonomous RFID transmissions. The temperature limits can be preset and are graphically illustrated in the Temperature Log graph of FIG. 2 as a pair of upper and lower horizontal lines 4a and 4b. Temperature plot 4c shows that the ambient temperature at the tag exceeded the upper limit 4a at times corresponding to time stamp numbers 4.5 and 8.0. The temperature logger can record a continuous rolling log such as exemplified by temperature plot 4c, whose length is limited only by the amount of memory available in memory module 4. In this way any interrogation may provide the maximum duration of temperature history prior to interrogation. Alternatively, an RFID tag may be triggered to start monitoring and to stop when its log is full. If the tag's time base lacks absolute accuracy then the log may also be time stamped, as graphically illustrated in FIG. 2, at significant times, tying particular points in the log to absolute times and dates for later reference. The log and time stamp data retrieval can be accomplished on demand, by a user with an interrogator, or any number of means automatically by interrogation or autonomous transmissions. Thus in the example of FIG. 2, a user may determine exactly when temperature limits placed on goods on, for example, a pallet having an RFID tag were exceeded, and consequently may determine exactly who was responsible for the resulting potential spoilage or reduced shelf life of the goods. This would typically point to a specific operator along the distribution path which the goods followed, for example a trucker or warehouseman.

Figure 3:
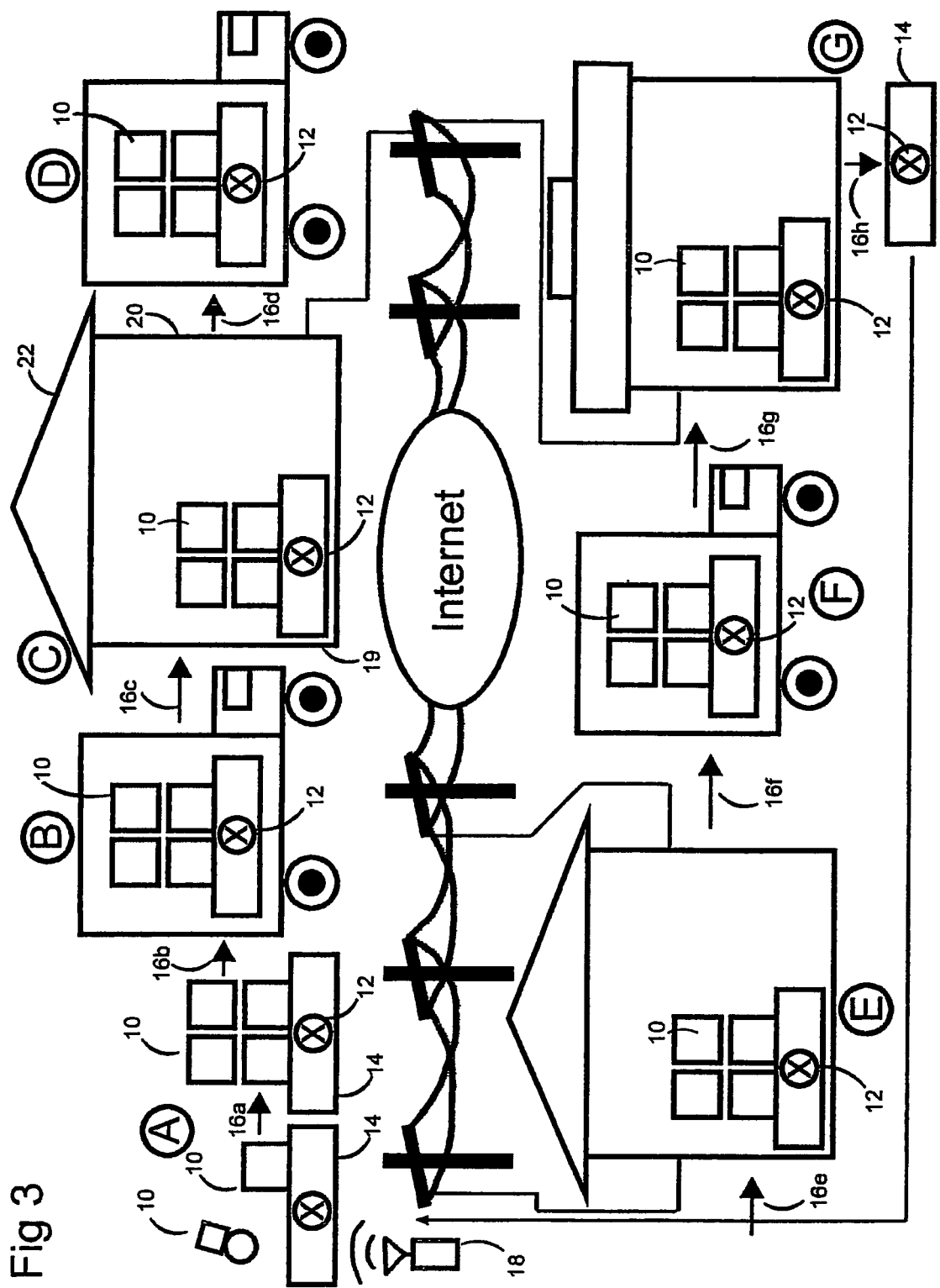
FIG. 3 is a diagrammatic illustration of the movement of palletised goods along a distribution path.

Thus seen in FIG. 3, is an example of the progress of palletized goods 10 moving along a distribution path. Firstly, producer A palletizes goods 10. The goods are then shipped via first transport B to a primary distributor C, where the palletized goods are stored. The goods are then shipped via second transport D to a secondary distributor E, where the palletized goods are again stored. Finally, the goods are shipped via third transport F to a retailer G. An RFID tag 12 attached to a corresponding pallet 14 for the duration of the distribution path may then serve three or more functions.

Firstly, RFID tag 12 will provide a unique identifier for pallet 14. This is useful in, at least, the tracking of the pallet. Secondly, RFID tag 12 may function as a packing slip indicating the contents of the palletized goods 10 and other application specific information. This data may be modified, for example to provide an audit trail in the event of breakage, and interrogated as the pallet is transported and stored between and in the various stages between the producer A and the retailer of the palletized goods. Thirdly, if the tag is equipped with, for example, temperature sensor 2, or other form of sensor relevant to the state of the palletized goods 10, then a time based log, such as plot 4c, of the sensed information may be maintained and regularly updated for historical and "snapshot" reporting to one or more RF interrogators 18, 20 or 22 (as better described below) along the distribution path indicated by arrows 16a–16g. Such RF interrogators may take at least one of three forms, namely, hand-held portable interrogators 18, fixed "choke-point" interrogators 20, and fixed "warehouse" broadcast interrogators 22.

Hand-held portable interrogators 18 are transceivers which may be used to interrogate specific pallet RFID tags, for example where it is desired to check a specific packing slip or temperature log. The interrogator may be held in proximity to the tag for a time sufficiently long to accomplish the required data transfer.

Fixed choke-point interrogators 20 are transceivers mounted to gateways or portals controlling entrance to, and exit from, distributors warehouses, loading docks, transports and the like. Each has a very limited range within which it may interact with an RFID tag. Where the tag is on a pallet, the pallet may be moved through the gateway quite quickly so as to only be within the effective range of an interrogator 20 for a short period of time. Data transfer has to occur within that short period of time. If multiple RFID tags are present on their corresponding pallets, all simultaneously within range of an interrogator 20, then data must be transferred from the multiple RFID tags all within the same short period of time. Further, because of drop-outs or other variable attenuation of the RF signals from the tags, and because of collisions between the responses to the interrogator from the multiple RFID tags, the interrogator must repeatedly poll the responses over and over again within the available time until a desired confidence level is attained. A desirable confidence level is one at which it becomes statistically improbable that the response from any one RFID tag has not been successfully received by the interrogator.

The problem of collisions occurs in communications networks that share a common communication medium like a radio frequency channel where the air time is split into a number of time slices or slots by means of Time Division Multiplexing (hereinafter TDM). These can be assigned for one device to realize a communication link to another device without fear of any other device stealing the assigned slot. Where assignment is impossible, the slots are used on a random basis. This is where collisions of 'data packets' can occur. Time slots are often grouped into frames for synchronization and other purposes. Where collisions occur, repeat transmissions are required until all the data packets survive transmission.

In the latter situation where devices, ignorant of each other, randomly try to use one of the predefined number of slots in a frame, the collision rate increases as the number of devices increases. The number of collisions is not proportional to the number of devices, but gets worse the higher the traffic. The choice of frame size is often a compromise between collision rate and latency. The lower the required collision rate, the longer in time the frame has to be, so as to provide more slots of pre-defined duration. Where the number of devices and traffic can vary greatly, this compromise leads to wasted communication channel capacity, i.e. wasted bandwidth.

A typical case may be where a roll call command is issued by an interrogator to determine the number of devices such as RFID tags using a radio frequency channel. The time given for the tags to respond, to minimize the number of collisions when they respond, can be tailored to the number of tags or traffic density. This time may advantageously be determined according to collision rate. In this way the roll call to interact with all of the RFID tags within range is completed in the shortest time. This not only makes available the bandwidth for other information to be transferred, but also optimizes the rate that the roll call can be issued, thereby capturing all RFID tags that are only within range for a short time.

The collision rate can be determined by the ratio of bandwidth used (the total available number of data packet time slots used whether successfully or not) to the successful use of the bandwidth (the number of valid data packets transferred, one per time slot). Bandwidth use is determined by duration of signal presence, indicated by increased signal strength, with respect to time. Successful use of bandwidth is determined by time used for valid data transfer with respect to time.

Thus as seen in FIG. 4a, which is an example of a frame size which is too large, i.e. one exhibiting inefficient latency, the total response frame size 24 is made up of a time-sequential array of individual time slots 26. A non-collided valid data packet transfer is a tag response 28, indicated by a blacked out slot 26, from a corresponding RFID tag 12 where no other tag responded simultaneously to the polling interrogator issuing interrogation command 32. The presence of the successful tag response 28, i.e. successful bandwidth use, is indicated by a corresponding elevation in signal strength, illustrated as square waveform 30 in FIG. 4b.

Fortunately, as illustrated in FIGS. 5a and 5b, elevated signal strength also indicates unsuccessful tag responses 34 (shown X'd in time slots 26) resulting from collisions where a plurality of RFID tags 12 respond to the same interrogation command 32 so as to produce overlapping or simultaneous responses. Thus the number of successful tag responses 28 can be compared with the total bandwidth use to estimate the number of response collisions 34. This enables the estimation of the collision rate.

Figure 6:
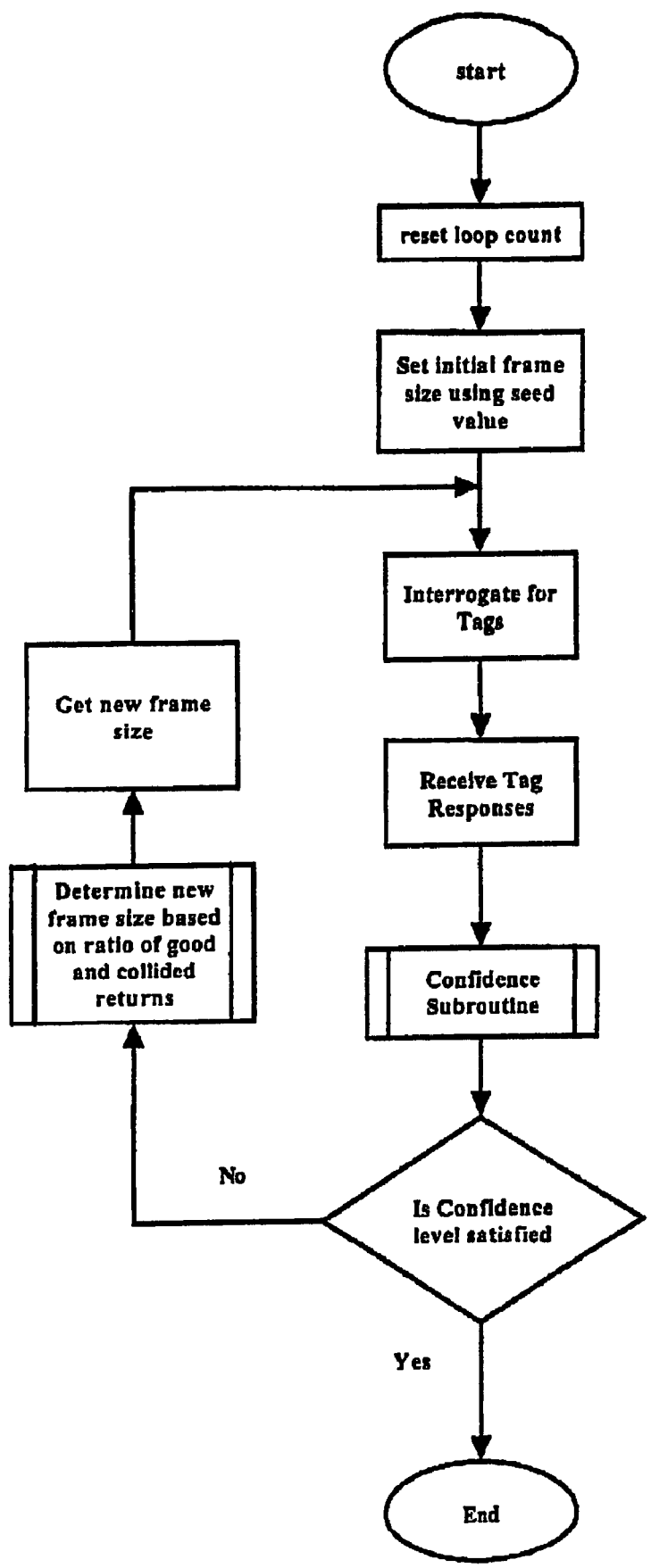
FIG. 6 is a logic flow chart of a roll call algorithm.
Figure 6A:
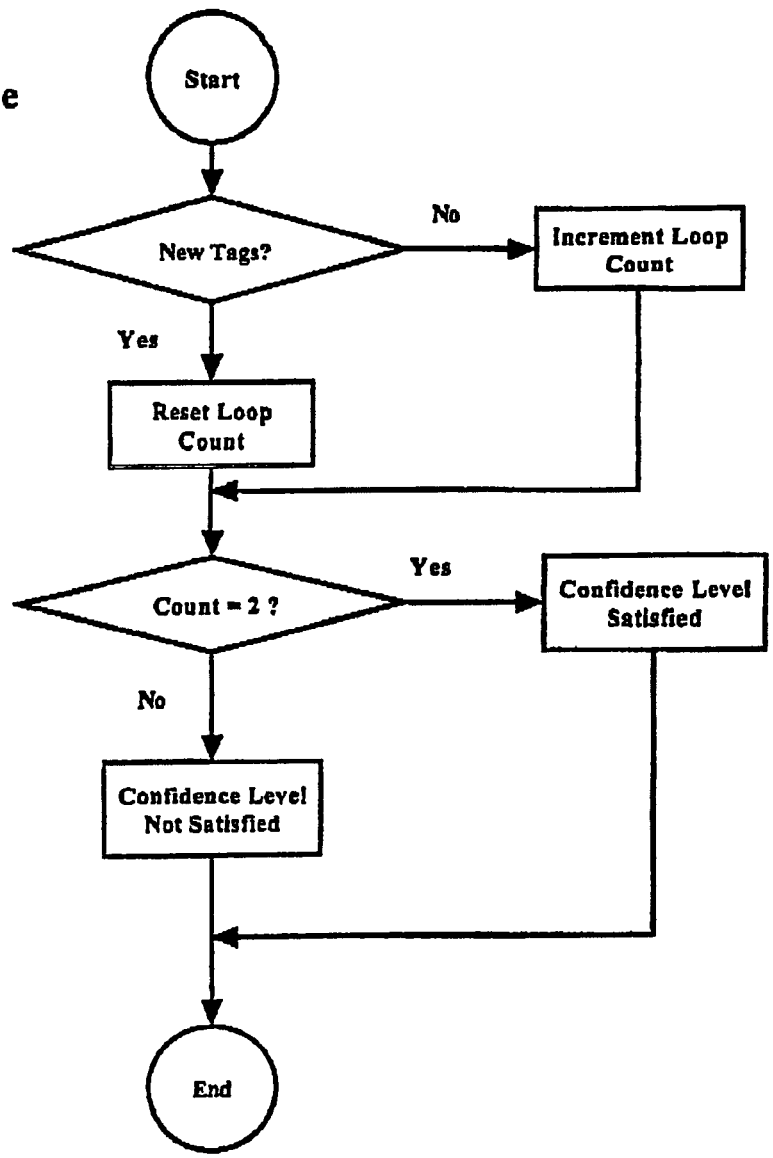
FIG. 6a is a logic flow chart for the confidence subroutine of the algorithm FIG. 6.

The collision rate may be used as the driving variable in a closed loop algorithm such as set out in FIG. 6 for adjusting and optimizing frame size 24 to ensure shortest latency. It has been found that an approximate 20–30% collision rate optimizes frame size 24. An algorithm for establishing a confidence level is set out in FIG. 6a.

If a synchronization portion of the frame includes a frame length indicator, then the devices choosing a time slot can choose from the total number of time slots indicated. In this way the frame length can be dynamic, linked to traffic density, thereby optimizing bandwidth use. In the case of RFID tags, synchronization and a frame length indicator are included in the signal from the interrogator to the tags. This provides for the above described time domain time division method of collision avoidance. To recap, in a responsive tag system such as with RFID tags, tags respond to interrogation. When the tag is not uniquely identified in the interrogation command, many or all tags within range respond. If the tags do not space out their responses they will all collide, making their responses unreadable. TDM is to space them out over a specific period of time. Where the tags' time of response is based on a random number algorithm, there is a statistical chance that they will collide. This chance will vary depending on the number of the tags responding, the duration of a response, the duration of the frame, and whether the tags responses are synchronized in slots or straddle slot boundaries. Because of the nature of RFID, with null spots caused by reflections of the radio signals etc., the tags are generally interrogated a number of times to provide an adequate level of certainty that all tags within range have responded. The number of repeat times depends on the certainty required and other limiting factors of the situation. Usually the greatest constraint is time, especially at "chokepoints".

Where either the interrogator, or tag, is moving, the read zone controlled by maximum read range limits the time that communication can exist between interrogator and tag. Even with small numbers of tags the range in numbers of tags to be read can be great. If the number of tags that can be expected ranges from 1 to 20, then the ratio is twenty. Setting a frame size to minimize number of collisions wastes most of the time if only a few tags are actually present.

You may be able to prevent tags, whose responses are heard, from responding to further interrogations, thereby reducing the subsequent number of responses. However, this does not remove the need to tailor the frame size to the number of tags expected to respond, in order to optimize efficiency. If the frame is too small as illustrated in FIG. 5a, it may result in many or all responses colliding and no tags being identified at all, making the apparatus mostly or totally ineffective.

The frame size algorithm of FIG. 6 seek to ensure optimum frame size for the number of expected tag responses at all times. This varies depending on feature enhancements, but could be expected to be in the range of 3–10:1. That is with frame size up to 10 times larger than the time taken for the total time for tags to respond.

Because the initial number of tags that will respond is unknown, a seed value must be used for the frame size that is an estimated best balance between wasting time in dead air time and collisions. The seed time could be fixed or dynamic, being modified by recent activity. For example, a historical average of 20 tag responses per frame might then be used to fix a seed value of 20 expected tag responses.

As noted above, the problem with the use of fixed choke point interrogators 20 is that the data contained in a tag can take considerable time to extract with respect to the time available at a conventional choke point, where automated data retrieval is implemented. Depending on the speed, and number of tags going through the choke point at one time, there may be a great risk of not successfully polling a tag and thus not retrieving its data.

One solution is to use fixed warehousing broadcast interrogators 22 in conjunction with RFID tags 12 transmitting either repeatedly at intervals in a continuous manner, or repeatedly for a limited time. Broadcast interrogators typically have an abundance of time within which to ensure that the data in a tag's memory is retrieved. Transmitting a portion of a tag's memory at a time at intervals allows many tags to use the same technique with little chance of collision. Data transmissions that do collide and are lost are repeated in subsequent repeat transmissions. The total duration for the transmissions to continue, the duration of a burst of data transmitted, and the interval between bursts can be adjusted depending on a number of considerations, such as battery life and number of tags concurrently broadcasting. Also depending on the urgency of data retrieval, the tag could be triggered, by a choke point interrogator 20 at a choke point portal 19 for example, and transmit the tag's data at a higher average rate (shorter interval or longer burst) to a waiting broadcast interrogator 22. If the urgency is less, a tag may transmit bursts on a continuous basis (literally all the time), but at greater intervals or with shorter bursts.

Much of the data 'collected' by an RFID tag 12 in its travel along a distribution path, such as distribution path 16a–16g in FIG. 3, has relevance to a number of different business entities. Data from upstream, for example data from producer A, can be read from any downstream interrogator, for example from retailer G, but not vice versa A supplier such as producer A may wish to ensure the environmental conditions during shipment of their product remain within preset limits, and a customer such as retailer G may wish to check on the progress of shipment of the palletized goods ordered. Typically, companies such as the separate enterprises along distribution path 16a–16g do not allow access to their computers by other companies. If they do, the protocols for data access vary widely. The suppliers computers can 'know' when an order was shipped by tracking the RFID tag leaving the warehouse or dock, and the customer can know the environmental conditions during transportation by interrogating the tag accompanying the goods, assuming the tag included environmental monitoring sensors and a memory log. The supplier, however, does not, without the feedback afforded by the present invention, have access to the downloaded environmental log and the customer does not have access to the shipping data.

Figure 8:
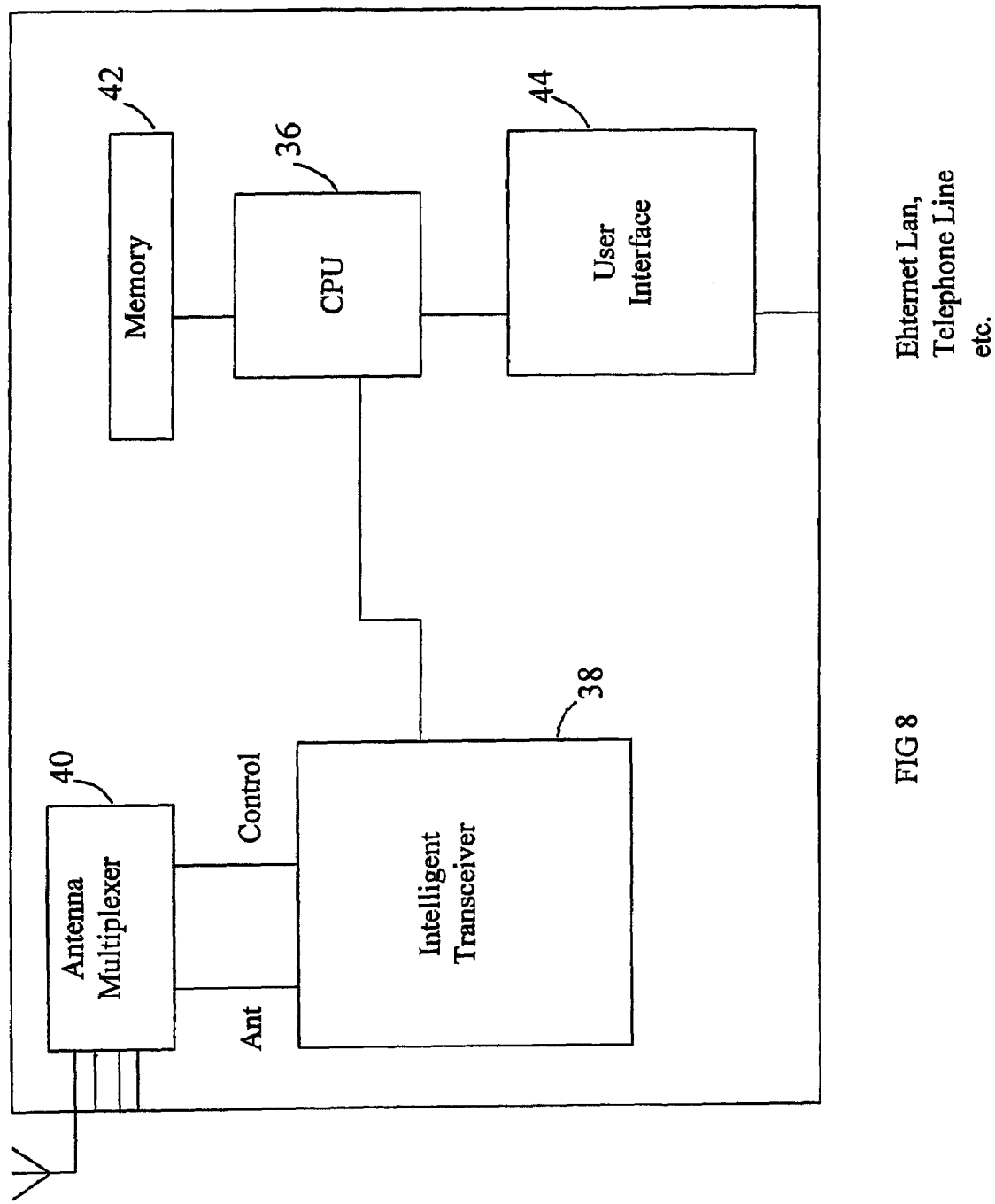
FIG. 8 is diagrammatic illustration of an interrogator.

The solution of the present invention is that data gathered from RFID tags is sent via the Internet to a central database 34 as seen in FIG. 7. The data is gathered in the above described manner by intelligent interrogators, whether interrogators 18, 20 or 22, such as depicted in FIG. 8. Interested and authorized businesses, whether upstream or downstream along distribution path 16*a*–16*g*, may then easily access the data they desire without the cost and risks associated with providing such businesses access to proprietary computer networks of businesses along the distribution path. The Internet is already fully integrated into many business computer networks, so accessing a Internet database can be automated and simple. The data from RFID tags, including tracking (monitoring movement) and environmental data, can be collected automatically by virtue of the tags' inherent communication capabilities. This automation can include networks of interrogators, controlled by computer systems. These systems can be connected to the Internet independently by cost effective dial-up telephone lines, or cable infrastructure, or by satellite uplink or the like, or via a company's existing computer system. In this way the tracking, environmental log, and purposefully written data, can be gathered or downloaded from tags, as they move from place to place, and uploaded into central database 34. The access to this data in all its varieties can then be accomplished via a protocol common for all businesses, for example, businesses A–G. Access to privileged information can be limited by encryption of the data, limiting access only to those who have the keys. In this way a 'pool' of businesses could share sets of common data.

With reference to FIG. 8, the interrogator performs TDM by means of a processor intelligent transceiver 38 and antenna multiplexer 40. Data downloaded from RFID tags 12 may be stored in memory 42. An optional user interface 44 controls when CPU 36 opens internet communications to download or upload information from database 34, otherwise CPU 36 may automatically do so.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for identification and monitoring of, and obtaining data relating to, products moving along a distribution path, comprising:

an RFID tag mountable to a product, or product carrier,
a plurality of interrogators spaced apart along said distribution path, wherein each interrogator of said plurality of interrogators cooperates in RF communication with said RFID tag when said RFID tag is in proximity to said each interrogator along said distribution path,
wherein said each interrogator interrogates said RFID tag during said RF communication so as to obtain unique data, unique to said RFID tag,
wherein said each interrogator communicates said unique data to a central data base,
a central database processor cooperating with said central database and communicating with said plurality of interrogators so as to obtain up-to-date data, including said unique data, from said RFID tag as said RFID tag progresses along said distribution path,
distributed processors along said distribution path also in communication with said central database processor so that said distributed processors may obtain feedback information and data from said central database no matter where said RFID tag is along said distribution path so as to obtain up-to-date product status data from said up-to-date data including said unique data,
wherein said RFID tag and said each interrogator each comprises a transceiver and memory, said memory cooperating with said transceiver.

2. The apparatus of claim 1 wherein said RFID tag further comprises a data gathering sensor.

3. The apparatus of claim 2 wherein said data gathering sensor is an environmental status sensor.

4. The apparatus of claim 3 wherein said environmental status sensor is a temperature sensor.

5. The apparatus of claim 1 wherein said plurality of interrogators include at least one choke point interrogator,
wherein said at least one choke point interrogator interrogates for ID's of said RFID tag by means of time division multiplexing,
and wherein frame sizes within said time division multiplexing are adjusted by an interrogator processor calculating, so as to optimize said frame sizes by an optimizing frame size adjustment of said frame sizes according to, a collision rate between responses from said RFID tag in response to said interrogation from said choke point interrogator and responses from other RFID tags within a choke point communication range of said choke point interrogator.

6. The apparatus of claim 5 wherein said collision rate is determined by said choke point interrogator by said interrogator processor comparing:
(a) a cumulative first time period within said frame sizes wherein a signal strength detected by said choke point interrogator is increased so as to indicate transmission of responses from said RFID tag or said other RFID tags, with
(b) a cumulative second time period within said frame sizes corresponding to known valid responses received by said choke point interrogator from said RFID tag or said other RFID tags.

7. The apparatus of claim 6 wherein said interrogator processor calculates said optimizing frame size adjustment by increasing a total cumulative time within said frame sizes if said collision rate is higher than an optimal collision rate, and by decreasing said total cumulative time within said frame sizes if said collision rate is lower than said optimal collision rate.

8. The apparatus of claim 7 wherein said choke point interrogator interrogates said RFID tag and said other RFID tags within said choke point interrogator communication range in a rollcall until a statistical confidence level is obtained as determined by said choke point interrogator processor calculating a confidence level and said confidence level indicating that said RFID tag and said other RFID tags have all successfully been identified.

9. The apparatus of claim 1 wherein said distributed processors spaced along said distribution path and said plurality of interrogators are located at corresponding producer, shipment, warehousing, and retailing locations.

10. The apparatus of claim 1 wherein said communication with said central database processor is via the internet.

11. The apparatus of claim 7 wherein said optimal collision rate is in the range between 20–30%.

12. The apparatus of claim 7 wherein said optimal collision rate is in the range between 10–40%.

13. An apparatus for identification and monitoring of, and obtaining data relating to, products moving along a distribution path, comprising:
   an RFID tag mountable to a product, or product carrier,
   a plurality of interrogators spaced apart along said distribution path, wherein each interrogator of said plurality of interrogators cooperates in RF communication with said RFID tag when said RFID tag is in proximity to said each interrogator along said distribution path,
   wherein said each interrogator interrogates said RFID tag during said RF communication so as to obtain unique data, unique to said RFID tag, wherein said RFID tag and said each interrogator each includes a transceiver and memory, said memory cooperating with said transceiver, and
   wherein said RFID tag further includes a data gathering sensor cooperating with said memory.

14. The apparatus of claim 13 wherein said data gathering sensor is an environmental status sensor.

15. The apparatus of claim 14 wherein said environmental status sensor is a temperature sensor.

16. The apparatus of claim 13 wherein said plurality of interrogators include at least one choke point interrogator,
   wherein said at least one choke point interrogator interrogates for ID's of said RFID tag by means of time division multiplexing,
   and wherein frame sizes within said time division multiplexing are adjusted by an interrogator processor calculating, so as to optimize said frame sizes by an optimizing frame size adjustment of said frame sizes according to, a collision rate between responses from said RFID tag in response to said interrogation from said choke point interrogator and responses from other RFID tags within a choke point communication range of said choke point interrogator.

17. The apparatus of claim 16 wherein said collision rate is determined by said choke point interrogator by said interrogator processor comparing:
   (a) a cumulative first time period within said frame sizes wherein a signal strength detected by said choke point interrogator is increased so as to indicate transmission of responses from said RFID tag or said other RFID tags, with
   (b) a cumulative second time period within said frame sizes corresponding to known valid responses received by said choke point interrogator from said RFID tag or said other RFID tags.

18. The apparatus of claim 17 wherein said interrogator processor calculates said optimizing frame size adjustment by increasing a total cumulative time within said frame sizes if said collision rate is higher than an optimal collision rate, and by decreasing said total cumulative time within said frame sizes if said collision rate is lower than said optimal collision rate.

19. The apparatus of claim 18 wherein said choke point interrogator interrogates said RFD tag and said other RFID tags within said choke point interrogator communication range in a rollcall until a statistical confidence level is obtained as determined by said choke point interrogator processor calculating a confidence level and said confidence level indicating that said RFID tag and said other RFD tags have all successfully been identified.

20. The apparatus of claim 13 wherein said each interrogator communicates said unique data to a central data base,
   a central database processor cooperating with said central database and communicating with said plurality of interrogators so as to obtain up-to-date data, including said unique data, from said RFID tag as said RFID tag progresses along said distribution path,
   distributed processors along said distribution path also in communication with said central database processor so that said distributed processors may obtain feedback information and data from said central database no matter where said RFID tag is along said distribution path so as to obtain up-to-date product status data from said up-to-date data including said unique data.

21. The apparatus of claim 20 wherein said distributed processors spaced along said distribution path and said plurality of interrogators are located at corresponding producer, shipment, warehousing, and retailing locations.

22. The apparatus of claim 20 wherein said communication with said central database processor is via the internet.

23. The apparatus of claim 18 wherein said optimal collision rate is in the range between 20–30%.

24. The apparatus of claim 18 wherein said optimal collision rate is in the range between 10–40%.

* * * * *